United States Patent [19]
Antoine et al.

[11] Patent Number: 5,079,733
[45] Date of Patent: Jan. 7, 1992

[54] PSEUDO-RANDOM SEQUENCE GENERATOR ARRANGEMENT

[75] Inventors: Patrick Antoine, Nanterre, France; Jean-Jacques Quisquater, Rhode St. Genese, Belgium

[73] Assignee: U.S. Philips Corporation, New York, N.Y.

[21] Appl. No.: 683,082

[22] Filed: Apr. 9, 1991

Related U.S. Application Data

[63] Continuation of Ser. No. 452,982, Dec. 19, 1989, abandoned.

[30] Foreign Application Priority Data

Dec. 30, 1988 [FR] France .................... 88 17499

[51] Int. Cl.$^5$ .................................................. G06F 1/02
[52] U.S. Cl. ........................................................ 364/717
[58] Field of Search ...................... 364/717; 331/78; 380/46, 50

[56] References Cited

U.S. PATENT DOCUMENTS

| | | | |
|---|---|---|---|
| 4,023,026 | 5/1977 | O'Farrell | 364/717 |
| 4,785,410 | 11/1988 | Hamatsu et al. | 364/717 |
| 4,845,654 | 7/1989 | Harada et al. | 364/717 |
| 4,864,525 | 9/1989 | Kurihara et al. | 364/717 |

Primary Examiner—Tan V. Mai
Attorney, Agent, or Firm—Edward W. Goodman

[57] ABSTRACT

The arrangement includes two basic shift registers (1, 3) which are arranged as multipliers whose initial content is predetermined by an internal key, and which are fed back to each other via a modifying member inserted in the loop. The modifying member (5) is an AND-gate controlled by a signal obtained from an OR-gate (8) to whose two inputs the bits which each come from two shift registers (33, 34) which are independent of the two first registers, are applied. These independent registers are modified one by the other, and this modification is effected by inserted bistable counters (10, 11). In addition, the two basic registers (1, 3) are linearly modified by insertion of bits originating from a source (28, 33, 34) which is external to the register to be modified. Each modifier bit is obtained more specifically from an AND-gate (21-25) to whose inputs the bits coming from the two above-mentioned independent registers (33, 34) are conveyed. The output of the pseudo-random sequence is obtained in parallel form by taking off several bits simultaneously from different stages of one of the basic shift registers (1), and the output bits are modified linearly (30, 32), on the basis of bits outputed by the independent registers.

19 Claims, 1 Drawing Sheet

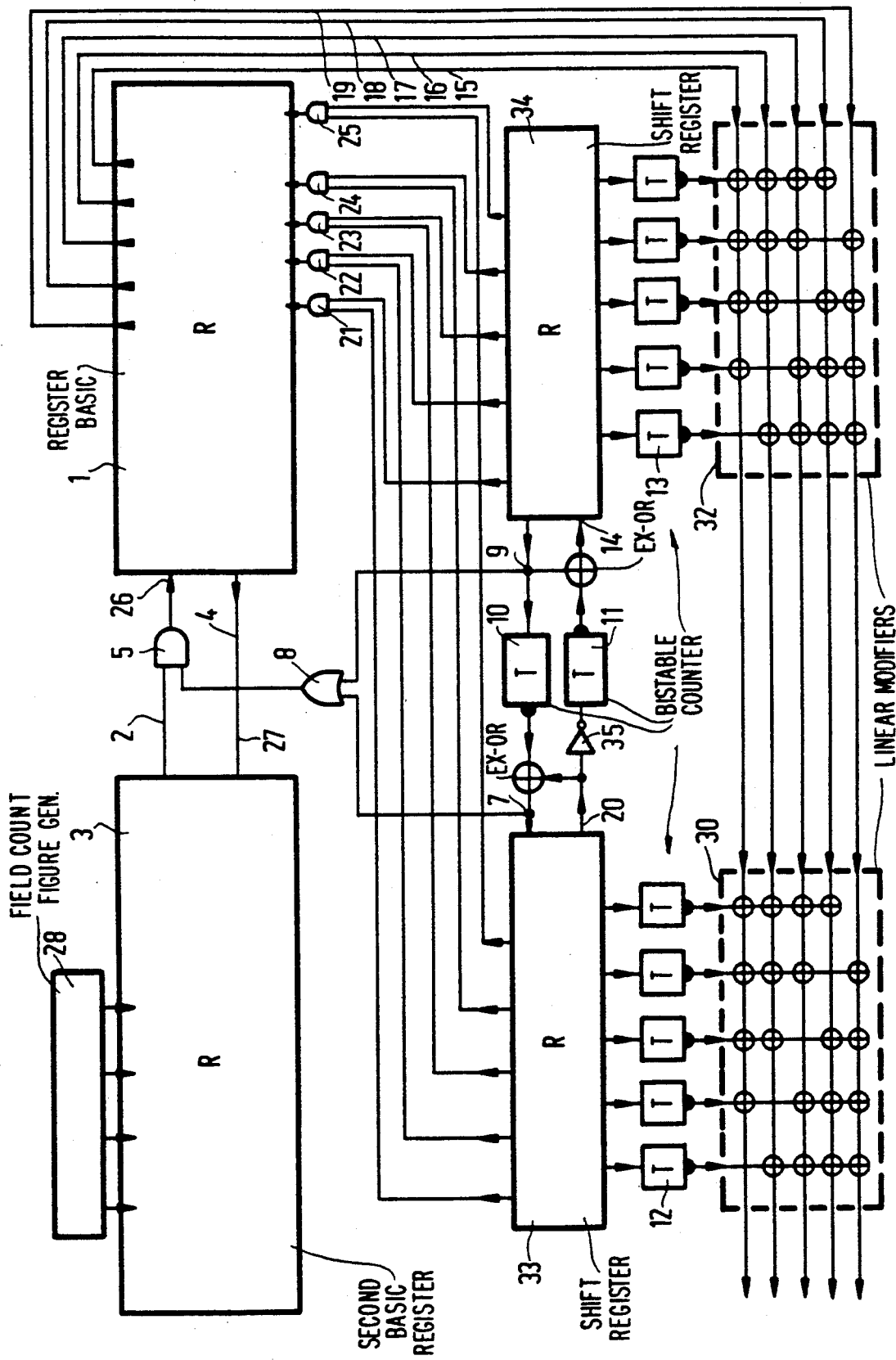

PSEUDO-RANDOM SEQUENCE GENERATOR ARRANGEMENT

This is a continuation of application Ser. No. 452,982, filed Dec. 19, 1989 now abandoned.

BACKGROUND OF THE INVENTION

1. Field of the Invention

The present invention relates to a pseudo-random sequence generator arrangement, including at least two basic shift registers which are arranged as multipliers, the shifts being controlled by pulses from a clock, the initial contents of the registers being preset by an internal key, and which are fed back to each other via a modifying member incorporated in the feedback loop

2. Description of the Related Art

Such an arrangement is disclosed in the European Patent Application EP-A-0,119,972. The arrangement described in said document comprises a plurality of pairs of registers whose outputs are combined in a logic circuit. In each pair, the registers are fed back to each other via a modifying member inserted in the loop, namely a change-over switch which has for its effect that either the main register is fed back to itself, or it is fed back via the second register. In addition, the second register is "disturbed" because of the fact that the clock pulse is applied thereto in bursts as a function of a bit count at the output.

Major problems, as regards the pseudo-random generators, are the following problems:

the chance of detection of its operating mode must be reduced. This means that it must be difficult to discover how the pseudo-random generator operates by observation of its output signals. For a linear generator, of the order n, it is sufficient to observe $2n-1$ consecutive elements of a sequence to characterize the generator completely. For non-linear generators it is necessary to observe many more elements;

one can try to detect the structure of the pseudo-random generator by a simulated data processing in real time of the multiplying polynomials, their feedback, and their interconnection, investigating different structures in turns. This simulation must be rendered sufficiently long to ensure that it becomes impossible to realize in actual practice. Nevertheless, the hardware devices must not be too complicated to implement. Also in that case a non-linear generator is more difficult to simulate;

the supplied sequences must have an adequately random character, that is to say they must obey the same laws as a real random sequence (wherein, for example, the statistic proportion of 1 bit to 0 bits is 50%). Moreover, the duration of the cycle, that is to say the cycle before a new identical sequence is found (assuming that the contents are not reinitialized) must be adequately long. With linear generators, the duration can be at its maximum and be constant and the sequences are statistically random. In contrast thereto, with non-linear generators, the duration of a cycle is variable and there is a risk of deterioration, resulting in the appearance of cycles which are too short and/or statistically not random.

SUMMARY OF THE INVENTION

The invention has for its object to produce a pseudo-random sequence generator which can provide the best compromise between the contradicting advantages of the linear and non-linear generators. It utilizes linear generators which are modified by non-linear operators which are controlled in such manner that they cause only little deterioration, and also no statistically non-random properties.

To this effect, in the device according to the invention, the modifying member is a gate which can interrupt the transfer of bits in at least a portion of the loop and is controlled by a signal supplied by at least one fed-back shift register and independently from the first two shift registers.

Advantageously, this gate is an AND-gate controlled by a signal coming from an OR-gate to whose inputs those bits are applied which each originate from such an independent shift register. Thus a slight non-linearity is introduced, without the risk of significant deterioration.

In addition, the complexity is increased without any significant degradation when the independent registers modify each other, and when furthermore this modification is effected by the insertion of at least one non-linear element, more specifically a bistable counter.

A second essential characteristic of the arrangement is that at least one of the two basic registers is linearly modified by inserting bits originating from a source external to the register to be modified. The detection is thus rendered more difficult, while the advantages of linear generators are preserved.

Each modifying bit can advantageously be obtained from an AND-gate to whose inputs the bits originating from two different independent registers are applied.

Advantageously, these two independent registers are the same as those controlling the modifying member of the loop of the basic registers.

While in the arrangement disclosed in the document EP-A-0,119,972, the pseudo-random sequence is the result of a logic combination of bits from a plurality of pairs of registers, in the arrangement according to the invention, outputting the pseudo-random sequence is effected in the parallel form by taking several bits simultaneously from different stages of one of the basic shift registers. Thus very effective characteristics are obtained, while not more than a total of four registers is used.

The performances are still more improved because of the fact that the output bits are linearly modified, on the basis of the bits originating from one or several independent register(s). This has for its advantage that any analysis by correlation based on the observation of outputs is highly complicated.

In addition, a non-linear element is advantageously inserted in the path of at least one bit coming from the register(s).

When the arrangement is used for decoding a television transmission, a clock with a much higher frequency is used during certain periods in which the supply of the codes is not necessary, the output of the sequence then being concealed, and the duration during which this clock with much higher frequency is applied is determined itself in a pseudo-random manner. This has the advantage that the number of clock pulses is much higher than the number of observable outputs, which reduces the possibility of detection of the consecutive states in the inverse ratio.

BRIEF DESCRIPTION OF THE DRAWING

The following description, which is given by way of non-limitative example with reference to the accompanying drawing, will make it better understood how the invention can be put into effect.

The sole FIGURE is a circuit diagram of the overall arrangement.

DESCRIPTION OF THE PREFERRED EMBODIMENT

The arrangement is used in an enciphered television system, for generating an 8-bit pseudo-random word which defines, for example, a cut-off point in a picture line. Eight bits are then necessary for each line, that is to say every 64 microseconds. In contrast to the system defined in the D2 MAC-packet standard, which comprises a clock of eight times the line frequency and produces in series eight bits per line, the present system supplies eight bits in parallel and, at least during the periods in which the supply of the codes is necessary, operates with a clock which supplies one single pulse per line. The difference with the system disclosed in the document FR-A-0,119,972, wherein the clock pulses can be interrupted in a semi-random manner by gates, is that in the present system, all the elements are activated together and regularly by the clock: there is therefore no sense in showing it in the Figure.

The pseudo-random frequency generators are based on the use of shift registers, which include a feedback link which conveys a bit linked with the output sequence to modifiers inserted between every two stages of the register. Arrangements of this type can constitute what are commonly denoted multiplier registers, which utilize mathematical analogy in accordance with which these registers effect the multiplication of a sequence of bits supplied serially to the input, by a polynomial.

All the registers of the present arrangement are loaded at the start with words produced by means of an algorithm which starts from an internal key associated with a code transmitted by the transmitter. This does not form part of the invention.

The arrangement is based on a multiplier register 1, denoted basic register, from which the pseudo-random sequence is drawn. The corresponding polynomial is of a comparatively high degree, for example comprised between 40 and 70; the basic cycle is therefore relatively long. This register is a register of a type using linear modifiers which are inserted between the stages of the register (it should be noted that a variant exists in which the modifiers are positioned in a feedback loop). The notion "linear modifiers" must here be understood to mean that the modifying bit is applied to an element which effects a modulo-2 addition (exclusive-OR) inserted in the loop.

A second register 3 is provided. This register is denoted the second basic register as it is coupled to the first register. This register is also arranged as a multiplier having linear modifiers inserted between certain stages. It can have a much lower degree, for example comprised between 5 and 20.

Instead of feeding these two registers back to each other in a customary manner, the feedback link of each of them is open, and the other register is inserted there. Thus, the output 2 of the register 3 is connected to the input 26 of the register 1, and the output 4 of the latter is connected to the input 27 of the register 3. In addition, the output 2 is connected to the input 26 via a dual-input AND-gate 5, which can interrupt the transfer of bits in that portion of the loop shown at the right hand in the drawing.

The second input of the AND-gate is controlled by a signal supplied by two shift registers 33, 34 independently of the two first ones.

These two registers 33 and 34 are fed back directly one to the other, the output 20 of the register 33 being looped back to its input 7, which also holds for the output 9 of the register 34 which is fed back to its input 14. The registers 33 and 34 are, for example, of a lower order than the order of the basic polynomial, and near to each other, of the order of 25 to 35.

A bistable counter 10 which is a non-linear element is connected to the output 9 of the register 34. Here a bistable counter denotes a counter whose output changes state (triggering effect) when a predetermined number of 1 bits has been counted at its input. All the bistable counters of the arrangement are initialized at the start. The output of the bistable counter 10 is combined with the output 20 of the register 33 in an "exclusive-OR" gate whose output value is applied to the input 7 of the register 33. A symmetrical arrangement is obtained by means of the bistable counter 11 arranged between the output 20 of the register 33 and the input 14 of the register 34. Thus, the two registers 33 and 34 are modified relative to each other and the counters disturb the sequence from time to time. If the counter is a count-by-n counter, an inversion of the future bits of the sequence occurs on an average every 2n clock pulses. The counters 10 and 11 have unequal counting values, which are not high, for example comprised between 4 and 12.

Moreover, an inverter 35 is inserted in the input of one of the counters, in this case the counter 11. This counter has for its object to provide that one of the counters counts zeros and the other one counts "ones", so as to avoid any self-blocking: if there are many zeros, the counter 11 changes state and changes the order of the sequence.

The second input of the AND-gate 5, which is inserted between the basic registers 3 and 1, is connected to the output of an OR-gate 8. An input of this gate 8 is connected to the input 7 of the register 33 and the other input is connected to the output 9 of the register 34. It should be understood that they might alternatively, in a variant, be connected to any random stage of these registers, without a fundamental change in the operating principle.

Sequences in which the 1 and the 0 appear with equal probability are applied to the inputs of the OR-gate 8. Because of the OR function, three quarter of the bits at the output of the gate 8 are in the 1 state (statistically). Consequently, the AND-gate 5 is in the non-conductive state during on an average only a quarter of the time: the sequences are therefore modified only little and consequently there is no risk of long series of zeros being obtained.

Bits supplied by an element 28 which furnishes a figure resulting from a count of television fields are introduced in the member of the register 3, and act on the linear modifiers (not shown); the resultant modification has for its object to avoid that the output is the same if periodically the same starting key is used again.

The register 1 is also modified, but in a more complex manner. The register comprises five linear modifiers (which are not shown so as not to complicate the FIGURE, their position in the arrangement being well known) to each of which a modifying bit originating from an AND-gate 21 to 25 is conveyed.

The points of insertion allow between them a certain number of register stages. The points in which the modifier bits are inserted are arranged such as to allow between them blocks of registers whose orders are different and as far as possible, incommensurable. If, for example, the register is of an order 67, a block of the order 19 can be provided between the output 4 and the point in which the bit coming from the gate 21 is inserted, followed by a block of the order 13 between the points in which the bit coming from the port 21 and the port 22 are inserted, thereafter a block of the order 11 between the points in which the bits originating from the gates 22 and 23 are inserted, a block of the order 7 between the points in which the bits coming from the gates 23 and 24 are inserted, a block of the order 17 between the points in which the bits from the gates 24 and 25 are inserted, the output of the gate 25 itself being directly applied to the input of the register.

The sum of the order of the partial blocks, 19+13+7+11+17 makes 67, which here is the order of the register. The orders of the blocks are all different and incommensurable. Nevertheless, other orders of the register for which it would not be possible to find values which are incommensurable must not be excluded a priory.

Each of the AND-gates 21 to 25 has two inputs. For each gate, one of the inputs is connected to an intermediate output of the register 33 and the other one to an intermediate output of the register 34. Here, by intermediate output is meant a connection branched between two stages at the inside (not shown) of a register. Many register inputs or outputs are not denoted individually by means of a reference numeral, to avoid computation of the Figure, arrows being sufficient to indicate that outputs or inputs are concerned.

Gates of the AND-type are here preferably chosen, for the following reason: with equally probable sequences of ones and zeroes at the input, each AND-gate 21 to 25 supplies 1 bit only for one quarter of the bits (statistically). Since there are five modifiers, the chances of modification are consequently 5/4, that is to say almost one chance per clock pulse.

Preferably the inputs of the same gate are connected to intermediate outputs of very different orders in the register 33 and in the register 34. For example, a gate can be connected to the output of the order 5 of the register 33 and to the output of the order 26 of the register 34. There are obviously a very large variety of equivalent possibilities, for that reason it is superfluous to indicate for each AND-gate to which order of registers it is connected. The intermediate outputs are, preferably, not equidistant.

The two registers 33, 34 have therefore several ways of influencing the two registers 3, 1. In constrast thereto, there is no return line from the registers 3, 1 to the registers 33, 34. They are consequently independent of the basic registers.

The register 1 includes five intermediate outputs 15 to 19, which supply a pseudo-random sequence of five parallel bits.

In the foregoing it has already been mentioned that eight bits were desirable. There are here however only five outputs. An analysis by correlation would be much easier if a larger number of connections were available, which to a certain extent "face" the register. For that reason only five bits are taken off, and subsequently they are expanded to eight bits. This expansion does not form part of the invention.

The points in which the pseudo-random sequence is taken, connected to the links 15 to 19 on the one hand, and the points in which the modifying bits linked to the outputs of the gates 21 and 25 are introduced on the other hand, are disposed in quincunx, that is to say that blocks are considered whose orders are incommensurable, which has been described in the foregoing, each of them provides one of the outputs, taken from among two of its stages.

An ultimate precaution to still further reduce the chance of detection consists in modifying the sequence taken from the register 1 in a linear manner, from the bits taken from the intermediate outputs of two independent registers 33, 34. To this effect, linear modifiers, that is to say "exclusive-OR" gates, each controlled by an output of the register, are inserted in five connecting lines 15 to 19. Such modifiers are symbolized by a + sign surrounded by a circle. A group 32 of modifiers is associated with the register 34, and a group 30 is associated with the register 33. The intermediate outputs of the registers 33, 34 utilized here are not the same as those connected to the gates 21 to 25. These two groups of outputs can, for example, also be arranged in quincunx.

Moreover, in each output connection of the register a bistable counter 12 or 13 is inserted. All those associated with the same register preferably have different and incommensurable counting values, for example 2, 5, 7, 9, 13 or 3, 5, 7, 11, 13 etc. Each counter output controls four gates which thus modify four of the five connecting lines 15-19. Each time, the non-modified connection line is different: for example for the register 34, the first output most to the left in the Figure does not modify the connection 15, the second output does not modify the connecting line 15, the second output does not modify the connecting line 16, and so forth, the fifth output at the utmost right does not modify a connecting line 19. Thus, the modification is linear.

During certain periods of time in which it is not necessary to supply codes, for example during the line retraces, a clock having a much higher frequency is used. This clock (not shown) can, for example, be obtained by multiplying the line frequency by means of a phase-locked loop oscillator.

The outputs are concealed during the field retraces, in order to prevent detection of the sequence during these periods.

To determine the duration during which the clock of a much higher frequency is used, a down-counter is initialized with a pseudo-random number. The latter is obtained by taking some internal bits from the pseudo-random generator. Thereafter, the down-counter counts down at the clock rate until zero, after which the clock of a much higher frequency is stopped and the beginning of the picture is awaited to start again with the line frequency clock.

With the above-described structure and the manner in accordance with which the non-linearities (namely the AND-gates and the bistable counters) are disposed, the system is very complex and nevertheless the risk of degeneration is small.

We claim:

1. A pseudo-random sequence generator arrangement, including at least two basic shift registers which are arranged as multipliers, the shifts being controlled by pulses from a clock, the initial contents of the at least two basic shift registers being preset by an internal key, and which are fed back to each other via a modifying member incorporated in the feedback loop, characterized in that said pseudo-random sequence generator arrangement further comprises at least one fed-back shift register, which is independent from said at least two basic shift registers, for generating a modifying signal, and the modifying member is a gate which interrupts the transfer of bits in at least a portion of the loop and is controlled by said modifying signal.

2. An arrangement as claimed in claim 1, characterized in that the gate is an AND-gate controlled by a signal coming from an OR-gate to whose inputs the bits are applied which are each supplied by said fed-back independent shift register.

3. An arrangement as claimed in one of the claims 1 or 2, characterized in that said arrangement comprises two fed-back independent registers which modify each other.

4. An arrangement as claimed in claim 3, characterized in that the modification of the two fed-back independent registers one by the other is effected with insertion of at least one non-linear element.

5. An arrangement as claimed in claim 4, characterized in that the non-linear element is a bistable counter.

6. An arrangement as claimed in claim 4, characterized in that there are two non-linear elements each comprising a bistable counter, and that an inverter is arranged in series with one of the two bistable counters.

7. An arrangement as claimed in any one of the claims 1 or 2, characterized in that at least one of the two basic registers is linearly modified by the insertion of bits coming from a source which is external to the register to be modified.

8. An arrangement as claimed in claim 7, employed for enciphering a television transmission, characterized in that one of the two basic registers is modified by a code obtained from counting the fields of the television picture.

9. An arrangement as claimed in claim 7, characterized in that one of the two basic registers is modified by insertion of modifying bits coming from said fed-back independent register.

10. An arrangement as claimed in claim 9, characterized in that each modifier bit is outputed by an AND-gate to whose inputs the bits coming from the two independent registers are applied.

11. An arrangement as claimed in claim 9, characterized in that the points at which the modifier bits are inserted are arranged to allow register blocks between them, whose orders are different and are substantially incommensurable.

12. An arrangement as claimed in claim 9, characterized in that the output of the pseudo-random sequence is obtained in parallel form by taking several bits simultaneously from different stages of one of the basic shift registers.

13. An arrangement as claimed in claim 12, characterized in that the points at which the pseudo-random sequence is taken off, and the points at which the modifier bits are inserted, are disposed in quincunx.

14. An arrangement as claimed in claim 12, characterized in that the output bits are linearly modified on the basis of the bits originating from one of the two independent registers.

15. An arrangement as claimed in claim 14, characterized in that the output bits are modified twice on the basis of the bits originating from the two independent registers.

16. An arrangement as claimed in claim 14, characterized in that a non-linear element is inserted in the path of at least one bit originating from the two independent registers.

17. An arrangement as claimed in claim 16, characterized in that the non-linear element is a bistable counter.

18. An arrangement as claimed in claim 1, used for enciphering a television picture, characterized in that a clock having a much higher frequency is used during certain periods in which the codes need not to be supplied, the output being concealed during this period.

19. An arrangement as claimed in claim 18, characterized in that the clock of a much higher frequency is used during a predetermined duration which is determined in a pseudo-random manner.

* * * * *